United States Patent

Henselman et al.

[15] 3,639,226

[45] Feb. 1, 1972

[54] SYNERGISTIC DEWAXING AND COMPOSITION

[72] Inventors: Richard O. Henselman, North Plainfield; Herbert G. Burkard, Convent Station, both of N.J.

[73] Assignee: Esso Research and Engineering Company

[22] Filed: June 15, 1970

[21] Appl. No.: 46,557

Related U.S. Application Data

[63] Continuation of Ser. No. 795,357, Jan. 30, 1969, abandoned, which is a continuation-in-part of Ser. No. 539,326, Apr. 1, 1966, abandoned.

[52] U.S. Cl. ..................................208/37, 44/62, 208/31, 208/33, 252/59, 260/80.78, 260/88.2
[51] Int. Cl. .................................C10g 43/06, C10g 43/08
[58] Field of Search......................208/33, 31, 37, 38, 59, 62; 252/59; 44/62

[56] References Cited

UNITED STATES PATENTS

| | | | |
|---|---|---|---|
| 3,108,944 | 10/1963 | Stoller | 208/33 |
| 3,239,445 | 3/1966 | Leonard et al. | 208/33 |
| 3,374,073 | 3/1968 | Gergel | 44/62 |
| 3,388,977 | 6/1968 | Burkard et al. | 44/62 |

*Primary Examiner*—Herbert Levine

[57] ABSTRACT

A wax modifying composition comprising the combination of (1) a Friedel-Crafts condensation product of a halogenated paraffin with an aromatic hydrocarbon and (2) an oil soluble copolymer of ethylene and a $C_3$–$C_{30}$ alpha olefin, or a terpolymer of ethylene with a $C_3$–$C_{30}$ alpha olefin and a minor amount of a nonconjugated diolefin. The copolymer and terpolymer may be improved by oxidation to form hydroperoxy materials followed by reduction to form reduced oxygenated compounds.

9 Claims, No Drawings

SYNERGISTIC DEWAXING AND COMPOSITION

CROSS-REFERENCES TO RELATED APPLICATIONS

This application is a continuation of application, Ser. No. 795,357 filed Jan. 30, 1969, which in turn is a continuation-in-part of application Ser. No. 539,326 filed Apr. 1, 1966, both applications now abandoned.

This application is a continuation-in-part of copending application, Ser. No. 539,326, filed Apr. 1, 1966 now abandoned.

BACKGROUND OF THE INVENTION

1. Field of the Invention

This invention relates to a novel dewaxing aid composition and to the utilization of same, and more particularly to a dewaxing aid comprising a combination of additives which synergistically improve the separation of waxes from petroleum oils.

2. Description of the Prior Art

Various methods are known in the art for separating wax from petroleum oil. One such method, for instance, is chilling the waxy oil and filtering off the solid wax. One of the most popular ways of dewaxing oils is known as solvent dewaxing. This comprises diluting the oil with a solvent, heating until complete solution is obtained, and then chilling until the desired amount of wax has crystallized out. The wax crystals thus formed are separated from the slurry by means of filtration. The wax is then further purified, while the solvent is recovered for reuse and the dewaxed oil is sent to other refinery processes.

Although such solvent dewaxing has largely replaced other processes for the separation of wax from hydrocarbon oils, filtration of the wax crystals from the slurry formed during dewaxing is difficult and often the filtration rate of the slurry limits the capacity of the entire process. The slurry filtration rate is determined primarily by the size and shape of the wax crystals formed during the chilling step of the process. Very fine crystals tend to clog the filter media rapidly reducing the filtration rate and eventually necessitating shutdown of the filters for removal of the accumulated wax. Very large crystals tend to form gellike interlocking masses which do not form a compact filter cake, which contain a large amount of oil and solvent, and which are difficult to wash. As a solution to this problem, it has become the practice in the art to incorporate in the wax-containing petroleum oil materials which modify the size and shape of wax crystals in such a manner as to permit more rapid separation of the wax during dewaxing operations. These materials are known as dewaxing aids. For example, it has been known for some time that Friedel-Crafts condensation products of halogenated paraffins and aromatic hydrocarbons are effective dewaxing aids for wax-containing petroleum oils. However, the continued need for more efficient petroleum dewaxing processes has raised the requirements of dewaxing and filtering aids. The provision of new and more efficient dewaxing aids is, therefore, of great importance to the petroleum refining art.

SUMMARY OF THE INVENTION

It has now been found, in accordance with this invention, that by incorporating in a petroleum oil, as dewaxing aids, the combination of (a) a conventional wax crystal modifier made by the Friedel-Crafts reaction, i.e., a condensation product of a halogenated paraffin with an aromatic hydrocarbon and (b) a polymer comprising ethylene and $C_3$—$C_{30}$ alpha-olefins, a synergistic improvement in the wax crystal characteristics of the oil over that provided by the incorporation of either of these two types of additives alone is obtained. It is, therefore, the primary object of this invention to provide a new and highly improved class of dewaxing aids. Other and further objects of the invention will become apparent from the following detailed description thereof.

The present invention contemplates the employment of any conventional wax crystal modifier (e.g., pour depressant, dewaxing aid, etc.) made by the Friedel-Crafts condensation of a halogenated paraffin with an aromatic hydrocarbon. The halogenated paraffin may, for example, contain from about eight to about 30 carbon atoms, preferably from about 16 to about 22, and from about 5 to about 25 weight percent chlorine, preferably from about 10 to about 18 weight percent. Typically, the halogenated paraffins used to prepare this well-known class of wax modifiers are themselves prepared by chlorinating to the aforedescribed chlorine content a paraffin wax having a melting point within the range between about 120° to about 190° F. The aromatic hydrocarbon used herein contains a maximum of three substituent groups and/or condensed rings and may be a hydroxy compound such as phenol, cresol, xylenol, or an amine such as aniline, but is preferably naphthalene, phenanthrene or anthracene. The Friedel-Crafts condensation products of the instant invention are prepared in accordance with well-known techniques, e.g., British Pat. Nos. 511,207 and 562,714.

The second general component of the instant invention is an oil-soluble polymer comprising ethylene and $C_3$—$C_{30}$ alpha-olefins. The ethylene-alpha-olefin polymers which are operable in the concept of this invention have a number average molecular weight in the range from about 500 to about 50,000, preferably in the range of about 1,000 to 15,000. The amount of ethylene present as compared to the amount of alpha-olefin present is in the range from about 5 to 95 mole percent, the preferred range being from 20 to 80 mole percent ethylene.

The alpha-olefins suitably employed in the instant invention include the substituted and unsubstituted mono-alpha-olefins containing from three to about 30 carbon atoms. The chains may be branched or unbranched and may contain cyclic structures. It is preferred, however, that the alpha-olefin be substantially linear. Nonlimiting examples of operable alpha-olefins include propylene, pentent-1, heptene-1, decene-1, dodecene-1, hexadecene-1, octadecene-1, eicosene-1, docosene-1, petracosene-1, octacosene-1, triacontene-1, and the like.

The ethylene-alpha-olefin polymers suitably employed in the present invention may contain a third unsaturated monomer such as, for example, a bicyclic, alicyclic or aliphatic nonconjugated diolefin containing from about six to about 15 carbon atoms. The amount of third monomer present is in the range of from about 0.5 to 20 mole percent, preferably from about 1 to about 7 mole percent based on the total amount of ethylene and alpha-olefin present. Nonlimiting examples of suitable monomers include cyclopentadiene, methylene norbornene, hexadiene, dicyclopentadiene, tetrahydroxylindene, 5-vinyl-2-norbornene, 2-methyl-norbornene, 2,4-dimethyl-2,7-octadiene, 3-methallyl cyclopentane, tetradecene, and 3-(2-methyl-1-propene) cyclopentene and the like.

Polymerization catalysts may or may not be used, i.e., in some instances the polymerization may be thermally initiated. In general, any of the conventional free radical catalysts may be used to effect polymerization of the $C_3$—$C_{30}$ alpha-olefins while Ziegler-type catalysts may be used to polymerize the $C_3$—$C_6$ alpha-olefins. These Ziegler-type catalysts may also be used to polymerize the $C_7$—$C_{30}$ alpha-olefins of the invention. Among the useful free radical catalysts are benzoyl peroxide, tert.-butyl hydroperoxide, di-tert.-butyl peroxide, cumene peroxide, and the like. The Ziegler-type catalyst used generally consists of a transition metal halide such as titanium tetrachloride, vanadium tetrachloride or vanadium oxytrichloride, and an aluminum alkyl compound such as aluminum triethyl or aluminum diethyl chloride and the like. The catalyst, where used, may vary in concentration from about 0.1 to about 5 percent by weight based on the reactants.

With further reference to the Ziegler-type catalysts, these catalysts are made of components of two types, namely, compounds of the heavy transition metals of groups IV, V, and VI of the periodic system beginning with titanium, vanadium, and chromium and organometallic compounds and hydrides of metals of groups I, II, and III of the periodic system wherein the amount of the compounds derived from a group IV–VI metal may range from 0.01 to 2.0 moles per mole of the organometallic compound. The compounds of the first type are preferably halides, oxyhalides, or alcoholates, while titanium and vanadium deserve preference as metals. The second component is preferably an organometallic compound of lithium, sodium, magnesium, or aluminum, in which the organic portions are preferably alkyl radicals. In these organometallic compound, the valence of the metal can be partially saturated by halogens or alkoxyls, provided, naturally, that at least one bond binds the metal directly to a carbon atom. Mixtures of two or more compounds of the type described above can often be used to advantage.

Effective catalysts for polymerizing the monomers of the invention include the following combinations: aluminum triisobutyl and vanadium trichloride; aluminum triisobutyl, aluminum chloride, and vanadium trichloride; vanadium tetrachloride and aluminum trihexyl; vanadium trichloride and aluminum trihexyl; vanadium triacetylacetonate and aluminum diethyl chloride; titanium tetrachloride and aluminum trihexyl, vanadium trichloride and aluminum trihexyl; titanium trichloride and aluminum trihexyl; titanium dichloride and aluminum trihexyl; etc.

Polymerization of the aforedescribed monomers is effected by conventional methods, e.g., U.S. Pat. Nos. 3,000,866, 3,093,621 and 2,933,480. Ziegler-catalyzed polymerizations are generally effected by reacting the monomers at atmospheric pressure in a suitable solvent (e.g., hexane, heptane, octane and the like) in the presence of a catalyst and at a temperature in the range within about 10° to 50° C. for a period of from about 10 minutes to 3 hours. Free radical polymerizations are typically effected by reacting the aforedescribed monomers in the presence of a catalyst and a suitable solvent at a pressure within the range of about 20 atmospheres to 1,000 atmospheres and a temperature within the range of about 50° to 300° C. for a period of about 4 to about 50 hours. In addition, the polymerization may be thermally initiated by reacting the monomers at a temperature within the range of about 200° to about 300° C.

While the aforedescribed ethylene-alpha-olefin polymers of the instant invention may be utilized without further processing, it has been found that the effectiveness of these materials may in some instances be improved by oxidation to form hydroperoxy materials followed by reduction to form reduced oxygenated compounds. The oxidation of these materials is disclosed in a copending application, Ser. No. 423,870, filed Jan. 6, 1965 now U.S. Pat. No. 3,388,977. In general, the ethylene-alpha-olefin copolymers and terpolymers may be oxidized to form the hydroperoxy materials by any one of several methods. The polymers may be oxidized in solution, or as a solid with an oxygen-containing gas with or without a free radical initiator such as peroxides, azo compounds, or metal salts. An effective method of oxidizing the polymer is to dissolve from about 1 to 20 percent by weight in a hydrocarbon diluent such as heptane or benzene and to pass air or oxygen through the solution at the desired temperature until oxidation of the required level is reached. The type of solvent is not critical to the invention. The polymer may also be oxidized as an emulsion or as a suspension in any fluid such as water. The solvent or suspending fluid need not be inert to oxidation under the conditions employed to oxidize the copolymer. The temperature and pressure conditions will vary with the type of solvent used for oxidation. Temperatures in the range of about 45° to 250° C. and pressures in the range of about 0.5 to 100 atmospheres are satisfactory. The oxygen-containing gas is preferably passed through the polymer solution or suspension in excess. Free radical initiators such as peroxides, hydroperoxides, azo compounds, diazo compounds, peresters, peracids, ozone, hydrogen peroxide, disulfides, persulfides, or hydrazines may be used in concentrations of about 0.001 weight percent and higher. Metal salts well known in the art may also be used to promote the oxidation.

Such compounds contain transition metal ions that are easily oxidized and reduced. Examples are iron, cobalt, vanadium, cerium or manganese salts. Soluble salts such as acetylacetonates or tallates of the metals are preferred for the hydrocarbon solutions, while water-soluble salts such as chlorides are preferred for the emulsions.

The oxidized material is then reduced as follows: the oxidized material, while still in solution, or suspension or as a solid, is contacted with a reducing agent. Such a reducing agent should be capable of reaction with oxidized groups on the polymer. Applicable methods include reaction with sodium sulphite, lithium aluminum hydride, sodium borohydride, tertiary phosphines, triethyl phosphite, hydrazine hydrate, aluminum amalgam, alkaline sodium sulfide, hydriodic acid and zinc dust-acetic acid. Reaction with acids or alkali as well as thermal treatment may also remove active oxygen-containing groups from the oxidized polymer. Removal of these groups is desirable, since the polymer is less reactive after reduction and may be conveniently stored without further reaction taking placed.

The product produced by the oxidation procedure is a soluble polymer of lower molecular weight than the starting polymer. The molecular weight depends on the extent and conditions employed during the oxidation. The number average molecular weight is in the range from about 500 to about 50,000, wherein the amount of active oxygen before reduction is in the range from about 2 to 500 milliequivalents per 100 g. of polymer as determined iodemetrically. Examination of the polymers by infrared spectroscopy shows that oxygenated groups are introduced on the polymer during oxidation and are retained during reduction. No active oxygen in the form of peroxides, hydroperoxides, or peracids is detected after reduction by any of the preferred methods. The preferred oxidized polymer products contain from about 0.5 to about 10 weight percent oxygen.

The oxidized polymer is recovered from solution by ordinary methods, e.g., by steam distillation of the solvent or by precipitation with an acetone-methanol mixture (3:1) followed by drying in a vacuum.

The dewaxing aids of this invention comprise from about 1 to about 99 percent by weight of the aforedescribed Friedel-Crafts condensation product and from about 1 to about 99 weight percent of the aforedescribed ethylene-alpha-olefin polymer. Particularly preferred proportions are admixtures comprising about 25 to about 75 weight percent of the Friedel-Crafts condensation product and from about 25 to bout 75 weight percent of the ethylene-alpha-olefin polymer.

The synergistic dewaxing aid composition may be utilized in a number of petroleum dewaxing operations such as, for example, the conventional solvent dewaxing processes. It has been found that in these dewaxing operations, the removal of precipitated wax from a petroleum oil can be substantially improved by the incorporation of from about 0.001 to about 5 weight percent, preferably 0.01 to about 1.0 weight percent (based on weight of wax-containing petroleum oil) of the dewaxing aid composition prior to the precipitation of the wax from the said oil. While the products of the present invention may be utilized to separate wax from a number of petroleum stocks such as residua, middle distillates and the like, it has special application to waxy lubricating oil fractions. These fractions generally range in boiling point from about 400 to about 900° F. and contain from about 5 to about 20 weight percent wax.

Various methods may be used to effect the blending of the synergistic dewaxing aid composition, the wax-containing oil, and the dewaxing solvent, where used. For example, the dewaxing aid and the wax-containing petroleum oil may be combined prior to the addition of a dewaxing solvent or alternately, the dewaxing solvent can be admixed with the oil prior to the addition of the dewaxing aid. Broadly, an admixing temperature of about 120° to about 250° F. is used. It is preferred, however, that the temperature be from about 160° to about 200° F.

The dewaxing aids of this invention are found compatible with other additive materials and may be blended successfully with petroleum oils containing minor amounts of viscosity index improvers, rust inhibitors, lubricity agents, oxidation inhibitors, and the like.

The invention can be more fully understood by reference to the following examples.

DESCRIPTION OF THE PREFERRED EMBODIMENTS

Example 1

An ethylene/propylene copolymer having a number average molecular weight of about 15,000 and containing about 60 weight percent ethylene was prepared by reacting 6 grams of ethylene with 4 grams of propylene in the presence of 1,000 ml. hexane at a temperature of about 25° C. and a pressure of about 1 atmosphere for a period of about 1 hour. The foregoing polymerization was effected by using a Ziegler catalysts system consisting of 0.06 grams of $Al(Et)_2Cl$ and 0.02 grams of $VCl_4$. Fifty grams of the polymerized product were accumulated and then dissolved in 2 liters of n-heptane and oxidized by passing 200 ml. of oxygen gas (at 80° C. 750 mm. Hg) containing 10 mg. of ozone per liter of oxygen through the solution. The pressure was maintained at about 1 atmosphere and the temperature at about 70° C. After 5 ½ hours of oxidation the polymer solution was contacted for 1 hour with an equal volume of an aqueous solution containing 5 weight percent sodium sulphite. The polymer solution was recovered and washed with an equal volume of distilled water three times. The resultant oxidized polymer was recovered by steam distillation of the n-heptane followed by vacuum drying at 40° C. for 20 hours. Fifty grams of a polymeric product containing 1.2 weight percent oxygen (as determined by neutron activation) were recovered.

Example 2

The following example illustrates the synergistic effect between a conventional Friedel-Crafts condensate (i.e., a condensation product of 4 moles of chlorinated 170° F. m.p. wax containing 12 weight percent chlorine with 1 mole of naphthalene) and the oxidized ethylene-propylene product prepared in example 1.

In this example 0.02 weight percent (based on weight of wax-containing oil) of the above wax-naphthalene condensate and 0.02 weight percent (based on weight of wax-containing oil) of the oxidized ethylene/propylene copolymer prepared in example 1 were admixed at 145° F. with a waxy lube oil having the properties shown in table I and hereinafter referred to as test oil.

TABLE I

PROPERTIES OF TEST OIL*

| Inspection | |
| --- | --- |
| ASTM Viscosity at 210° F., SUS | 135 |
| Boiling Point Range, ° F. | 400–900 |
| ASTM Pour Point, ° F. | 145 |
| ASTM Gravity, ° API, 60/60 ° F. | 27.1 |
| Wax Content, weight percent | 12 |

*Baton Rouge bright stock from East Mississippi crude.

The above additive mixture-test oil blend was dewaxed in a conventional solvent dewaxing process, i.e., the additive-oil blend was dewaxed by diluting with hexane at a hexane/oil ratio of 3.5/1 and then chilling at the rate of 2° F. per minute from a feed temperature of 145° F. to a filter temperature of −30° F. The chilled mixture was then continuously filtered through a leaf filter at a pressure differential of 20 inches of mercury. The filtration cycle consisted of a filtration time of 36 seconds, a drying time of 9 seconds, a wash time of 27 seconds, and a second drying time of 18 seconds.

Other samples of the test oil were dewaxed in the same manner as above except that 0.04 weight percent (based on weight of wax-containing oil) of each of the individual components of the dewaxing aid admixture was added to a separate oil sample prior to chilling. The feed mixtures comprising 0.04 weight percent of the individual dewaxing aids i.e., wax-naphthalene condensate or the oxidized ethylene-propylene copolymer) were then separately processed under the same dewaxing conditions as used in the aforedescribed operation wherein the dewaxing aid admixture was used.

The data obtained from the above respective dewaxing operations were as shown in table II.

TABLE II

DEWAXING A WAXY LUBE OIL

| Dewaxing Aid Used | Filtration rate, gal./hr. ft.² | Oil Yield % |
| --- | --- | --- |
| None | 7 | 80 |
| 0.04 wt. % of wax-naphthalene condensate | 14 | 82 |
| 0.04 wt. % of oxidized copolymer* | 8 | 82 |
| 0.04 wt. % of 50/50 mixture of wax-naphthalene condensate/oxidized copolymer* | 20 | 82 |

*Copolymer of ethylene with propylene.

As will be apparent from an examination of the comparative data reported in table II, the combination of the additive components of this invention impart a marked improvement over that obtained with either additive alone. In other words, the addition of an essentially inactive additive i.e., the oxidized ethylene-propylene copolymer) to the wax-naphthalene condensate has imparted at least a 40% improvement (i.e., from 14 gal./hr. ft.² to 20 gal./hr ft.²) over that which could be obtained by the se of an equivalent weight amount of either material alone.

EXAMPLE 3

In another test, an ethylene-propylene-methylene norbornene terpolymer comprising 68 weight percent ethylene and 4 weight percent methylene norbornene and having a number average molecular weight of about 7,200 was prepared by essentially the same polymerization conditions described in example 1. The terpolymer was blended in the test oil alone and in combination with the wax-naphthalene condensate described in example 2. These oil-dewaxing aid blends were then processed according to the solvent dewaxing operation described in example 2. The comparative filtration rates for the oils containing no additive, 0.04 weight percent of the wax-naphthalene condensate, 0.04 weight percent of the ethylene-propylene-methylene norbornene terpolymer, and 0.04 weight percent (wt. percent are based on weight of wax-containing oil) of an additive admixture containing equal amounts of the wax-naphthalene condensate and the ethylene-propylene-methylene norbornene terpolymer are shown in table III.

TABLE III

DEWAXING

WAXY LUBE OIL

| Dewaxing Aid Used | Filtration Rate, gal./hr. ft.² | Oil Yield |
| --- | --- | --- |

| | | |
|---|---|---|
| None | 7 | 80 |
| 0.04 wt. % of wax-naphthalene condensate | 14 | 82 |
| 0.04 wt. % of terpolymer* | 8 | 81 |
| 0.04 wt. % of 50/50 mixture of wax-naphthalene condensate/ terpolymer* | 23 | 82 |

*Terpolymer of ehtylene-propylene-methylene norbornene.

From the data in table III, the synergistic effect provided by the combination of the wax-naphthalene condensate with the ethylene-propylene-methylene norbornene terpolymer is evident. Thus, the combination of the additive components of the instant invention has, in this example, imparted at least a 60 percent improvement over that which could be obtained by the use of an equivalent weight amount of either material alone.

Example 4

This example illustrates the preparation of an ethylene-$C_{20}$ alpha-olefin copolymer, and the enhanced coaction between this copolymer and a conventional wax crystal modifier made by the Friedel-Crafts condensation reaction.

Four hundred and forty grams of $C_{20}$ alpha-olefin, 10 grams of t-butyl peroxide, 200 ml. of benzene and 2,000 pounds of ethylene gas pressure were charged into a 3-liter stainless steel bomb, i.e., pressure reactor, and heated for 12 hours at 300° C. The unreacted monomer and solvent were then removed by distillation under vacuum. 670 grams of a greasy white polymer were recovered.

The above copolymer was blended in the aforedescribed test oil alone and in combination with the wax-naphthalene condensate described in example 2. These oil-dewaxing aid blends were then processed according to the solvent dewaxing operation described in example 2. The comparative filtration rates for the oils containing no additive, 0.04 weight percent of the wax-naphthalene condensate, 0.04 weight percent of the ethylene-$C_{20}$ alpha-olefin and 0.04 weight percent (weight percent are based on weight of wax-containing oil) of an additive admixture containing equal amounts of the wax-napthalene condensate and the ethylene-$C_{20}$ alpha-olefin polymer are shown in table IV. It is again seen that the incorporation of the additives of the instant invention synergistically improves the wax crystal characteristics of the oil.

TABLE IV

DEWAXING A WAXY LUBE STOCK

| Dewaxing Aid Used | Filtration Rate gal./hr. ft.² |
|---|---|
| None | 5 |
| 0.04 wt. % of wax-naphthalene condensate | 18 |
| 0.04 wt. % of copolymer* | 6 |
| 0.04 wt. % of 50/50 mixture of wax-naphthalene condensate/copolymer* | 22 |

*Copolymer of ethylene with $C_{20}$ alpha-olefin.

It is not intended to restrict the present invention to the foregoing examples, but rather it should be only limited by the appended claims.

We claim:

1. A dewaxing aid composition comprising a mixture of about 25 to 75 weight percent of a pour depressing Friedel-Crafts condensation product of an aromatic hydrocarbon having a maximum of three substituent groups and/or condensed rings and a halogenated paraffin having eight to 30 carbon atoms and about 75 to 25 weight percent of a copolymer comprising about 5 to 95 mole percent of ethylene and $C_3$-$C_{30}$ alpha-olefin, said copolymer having a molecular weight within the range of about 500 to 50,000.

2. A dewaxing aid composition comprising a mixture of about 25 to 75 weight percent of a pour depressing Friedel-Crafts condensation product of naphthalene and a paraffin wax having melting point of 120° to 190° F. chlorinated to contain 5 to 25 weight percent chlorine, and about 75 to 25 weight percent of a copolymer comprising bout 5 to 95 mole percent ethylene and $C_3$-$C_{30}$ alpha-olefin, said copolymer having a molecular weight within the range of about 500 to 50,000.

3. A dewaxing aid composition comprising a major proportion of a wax containing petroleum oil and a wax modifying amount of a synergistic mixture of about 25 to 75 weight percent of a Friedel-Crafts condensation product of naphthalene and a paraffin wax having a melting point of 120° to 190° F. chlorinated to contain 5 to 25 weight percent chlorine, and about 75 to 25 weight percent of a copolymer comprising about 5 to 95 mole percent ethylene and $C_3$-$C_{30}$ alpha-olefin, said copolymer having a molecular weight within the range of about 500 to 50,000.

4. A composition according to claim 3 wherein said copolymer has been oxidized and then reduced.

5. A composition according to claim 3 wherein said alpha-olefin contains from about 12 to about 24 carbon atoms.

6. A composition according to claim 3 wherein said alpha-olefin is propylene, said copolymer being oxidized and then reduced.

7. A composition according to claim 3 wherein said copolymer contains a $C_{10}$-$C_{15}$ nonconjugated diolefin present in a concentration of about 0.5 to 20 mole percent based upon the total amount of ethylene and $C_3$-$C_{30}$ alpha-olefin present.

8. A composition according to claim 7 wherein said diolefin is methylene norbornene.

9. In the process for the separation of wax from petroleum oils by the steps which include chilling the oil to form solid wax crystals and removing said wax crystals; the improvement of incorporating into said oil prior to formation of said wax crystals, a dewaxing aid comprising a synergistic mixture of about 25 to 75 weight percent of a Friedel-Crafts condensation product of naphthalene and a paraffin wax having a melting point of 120° to 190° F. chlorinated to contain 5 to 25 weight percent chlorine, and about 75 to 25 weight percent of a copolymer comprising about 5 to 95 mole percent ethylene and $C_3$ to $C_{30}$ alpha-olefin, said copolymer having a molecular weight of about 500 to 50,000.

* * * * *